(12) United States Patent
Scherer et al.

(10) Patent No.: US 11,125,101 B2
(45) Date of Patent: Sep. 21, 2021

(54) TURBOMACHINE SEALING RING

(71) Applicant: MTU Aero Engines AG, Munich (DE)

(72) Inventors: Christian Scherer, Roehrmoos (DE);
Peter Eibelshaeuser, Munich (DE);
Steffen Schlothauer, Erdweg (DE);
Andreas Jakimov, Fahrenzhausen (DE); Juergen Kraus, Dachau (DE)

(73) Assignee: MTU Aero Engines AG, Munich (DE)

( * ) Notice: Subject to any disclaimer, the term of this patent is extended or adjusted under 35 U.S.C. 154(b) by 136 days.

(21) Appl. No.: 16/018,441

(22) Filed: Jun. 26, 2018

(65) Prior Publication Data

US 2019/0010820 A1 Jan. 10, 2019

(30) Foreign Application Priority Data

Jul. 4, 2017 (DE) .......................... 102017211316.2

(51) Int. Cl.
*F01D 11/12* (2006.01)
*F01D 9/04* (2006.01)
(Continued)

(52) U.S. Cl.
CPC ............. *F01D 11/122* (2013.01); *B28B 1/001* (2013.01); *F01D 9/04* (2013.01); *F01D 11/001* (2013.01); *F01D 11/127* (2013.01); *F01D 25/246* (2013.01); *F05D 2230/22* (2013.01); *F05D 2230/60* (2013.01); *F05D 2240/11* (2013.01); *F05D 2240/55* (2013.01); *F05D 2250/283* (2013.01)

(58) Field of Classification Search
CPC .... F01D 11/122; F01D 11/127; F01D 11/001; F01D 11/08; F01D 11/125; F01D 9/04; F01D 25/246; F01D 11/12; F05D 2230/22; F05D 2230/60; F05D 2240/11; F05D 2240/55; F05D 2250/283; B28B 1/001
See application file for complete search history.

(56) References Cited

U.S. PATENT DOCUMENTS 3,079,128 A * 2/1963 Burge .................... F01D 17/162
415/191
3,558,237 A * 1/1971 Wall, Jr. ................ F01D 17/162
415/115
(Continued)

FOREIGN PATENT DOCUMENTS

CN 103722171 4/2014
DE 102006004090 A1 8/2007
(Continued)

*Primary Examiner* — Igor Kershteyn
*Assistant Examiner* — Joshua R Beebe
(74) *Attorney, Agent, or Firm* — Davidson, Davidson & Kappel, LLC

(57) ABSTRACT

A sealing ring for a turbomachine, in particular a compressor or turbine stage of a gas turbine is provided, the sealing ring having an, in particular at least partially honeycomb-like and/or integral, seal, in particular an abradable coating (13); a profile cross section of the sealing ring, which is in particular at least partially manufactured by a generative manufacturing process, varying in the circumferential direction, in particular at least in some regions continuously and/or non-continuously at one or more circumferential positions, in particular separation points.

27 Claims, 3 Drawing Sheets

(51) Int. Cl.
*F01D 25/24* (2006.01)
*F01D 11/00* (2006.01)
*B28B 1/00* (2006.01)

(56) References Cited

U.S. PATENT DOCUMENTS

| | | | |
|---|---|---|---|
| 4,243,169 A * | 1/1981 | Sara | F01D 11/122 228/175 |
| 4,379,812 A * | 4/1983 | Sara | C04B 35/645 428/577 |
| 4,521,496 A * | 6/1985 | Sara | F01D 11/122 428/551 |
| 4,767,267 A | 8/1988 | Salt | |
| 4,792,277 A * | 12/1988 | Dittberner, Jr. | F01D 11/001 415/160 |
| 4,834,613 A * | 5/1989 | Hansen | F01D 17/162 415/160 |
| 4,897,021 A * | 1/1990 | Chaplin | F01D 5/22 267/160 |
| 4,990,056 A * | 2/1991 | McClain | F01D 11/001 29/889.22 |
| 5,483,792 A * | 1/1996 | Czachor | F01D 25/162 60/796 |
| 5,639,212 A * | 6/1997 | Schaefer | F01D 11/001 415/173.1 |
| 6,129,512 A * | 10/2000 | Agram | F01D 17/162 415/160 |
| 6,139,264 A | 10/2000 | Schilling | |
| 6,361,273 B1 * | 3/2002 | Eng | F01D 9/00 415/173.1 |
| 6,537,020 B2 | 3/2003 | Humhauser | |
| 7,775,766 B2 | 8/2010 | Meier et al. | |
| 8,061,965 B2 | 11/2011 | Daeubler et al. | |
| 8,684,069 B2 | 4/2014 | Mottin et al. | |
| 8,876,466 B2 * | 11/2014 | Pattinson | B23K 26/206 415/116 |
| 9,079,245 B2 * | 7/2015 | Durocher | F01D 9/02 |
| 9,133,712 B2 | 9/2015 | Fisk et al. | |
| 9,289,917 B2 | 3/2016 | Bucci et al. | |
| 9,382,809 B2 | 7/2016 | Bayer et al. | |
| 9,587,499 B2 | 3/2017 | Albers et al. | |
| 9,664,059 B2 | 5/2017 | Feldmann et al. | |
| 9,771,827 B2 | 9/2017 | Stanka et al. | |
| 9,784,131 B2 | 10/2017 | Feldmann et al. | |
| 9,803,494 B2 | 10/2017 | Stricker et al. | |
| 9,920,645 B2 | 3/2018 | Mahle et al. | |
| 9,963,993 B2 | 5/2018 | Feldmann | |
| 10,047,618 B2 | 8/2018 | Hess et al. | |
| 10,280,941 B2 * | 5/2019 | Mouton | F01D 17/162 |
| 10,480,340 B2 | 11/2019 | Gaebler et al. | |
| 2003/0170115 A1 * | 9/2003 | Bowen | F01D 9/02 415/160 |
| 2006/0056963 A1 | 3/2006 | Abadie et al. | |
| 2009/0041610 A1 | 2/2009 | Meier et al. | |
| 2009/0304497 A1 | 12/2009 | Meier et al. | |
| 2012/0181255 A1 | 7/2012 | Bruck et al. | |
| 2013/0189085 A1 | 7/2013 | Werner et al. | |
| 2013/0209240 A1 * | 8/2013 | McCaffrey | F01D 11/22 415/173.2 |
| 2014/0044526 A1 | 2/2014 | Humhauser et al. | |
| 2014/0065343 A1 | 3/2014 | Hess et al. | |
| 2014/0161601 A1 | 6/2014 | Geiger et al. | |
| 2014/0161624 A1 | 6/2014 | Bayer et al. | |
| 2015/0086331 A1 * | 3/2015 | Hess | F01D 9/04 415/111 |
| 2015/0132124 A1 * | 5/2015 | Albers | F01D 11/001 415/209.3 |
| 2015/0132136 A1 | 5/2015 | Feldmann | |
| 2015/0192025 A1 * | 7/2015 | Boeck | F01D 9/04 415/173.7 |
| 2015/0322808 A1 * | 11/2015 | Wulf | B22F 3/1115 277/414 |
| 2015/0354406 A1 | 12/2015 | Farris et al. | |
| 2016/0003083 A1 | 1/2016 | Delisle et al. | |
| 2016/0123160 A1 * | 5/2016 | Strock | B32B 3/12 428/116 |
| 2016/0130960 A1 | 5/2016 | Corteauisse et al. | |
| 2016/0130969 A1 | 5/2016 | Gold | |
| 2016/0138413 A1 | 5/2016 | Corteauisse et al. | |
| 2016/0222807 A1 | 8/2016 | Liebl et al. | |
| 2016/0230582 A1 * | 8/2016 | Schlothauer | F01D 11/08 |
| 2016/0279734 A1 | 9/2016 | Schick et al. | |
| 2016/0290164 A1 | 10/2016 | Liebl et al. | |
| 2016/0298640 A1 | 10/2016 | Wilber et al. | |
| 2017/0159482 A1 | 6/2017 | Kufner et al. | |
| 2017/0261003 A1 * | 9/2017 | Mouton | F01D 17/162 |
| 2017/0298777 A1 * | 10/2017 | Lamusga | F01D 25/28 |

FOREIGN PATENT DOCUMENTS

| | | |
|---|---|---|
| DE | 10259963 B4 | 4/2010 |
| DE | 102010049068 A1 | 4/2012 |
| DE | 102010054113 A1 | 6/2012 |
| DE | 102011108957 A1 | 1/2013 |
| DE | 102012200883 A1 | 7/2013 |
| DE | 102012201050 A1 | 7/2013 |
| DE | 102012222379 A1 | 6/2014 |
| DE | 102013205883 A1 | 10/2014 |
| DE | 102013212465 A1 | 12/2014 |
| DE | 2829687 A1 | 1/2015 |
| DE | 102013219024 A1 | 4/2015 |
| DE | 102013222980 A1 | 6/2015 |
| DE | 102014208801 A1 | 11/2015 |
| DE | 102015202070 A1 | 8/2016 |
| DE | 102015216208 A1 | 3/2017 |
| DE | 102015224160 A1 | 6/2017 |
| EP | 3 56 684 A1 | 3/1990 |
| EP | 1149985 A2 | 10/2001 |
| EP | 1229213 A1 | 8/2002 |
| EP | 1702138 B1 | 5/2007 |
| EP | 2647795 A1 | 10/2013 |
| EP | 2728124 A1 | 5/2014 |
| EP | 2787177 A1 | 10/2014 |
| EP | 2818643 A1 | 12/2014 |
| EP | 2829689 A1 | 1/2015 |
| EP | 2871325 A1 | 5/2015 |
| EP | 2881545 A1 | 6/2015 |
| EP | 2884054 A1 | 6/2015 |
| EP | 2884055 A1 | 6/2015 |
| EP | 102004010236 A1 | 9/2015 |
| EP | 3051068 A1 | 8/2016 |
| EP | 3075471 A1 | 10/2016 |
| WO | WO 2012072384 | 6/2012 |
| WO | WO 2013010529 A1 | 1/2013 |
| WO | WO-2015079144 A1 * | 6/2015 ........ F04D 29/563 |
| WO | WO 2016142631 | 9/2016 |

\* cited by examiner

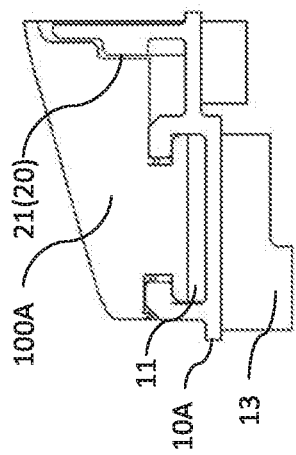
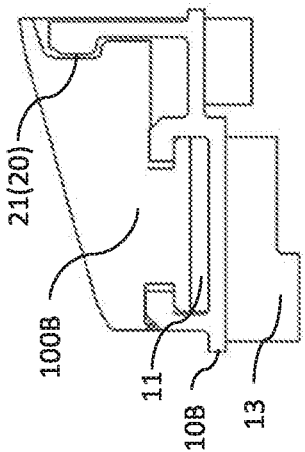
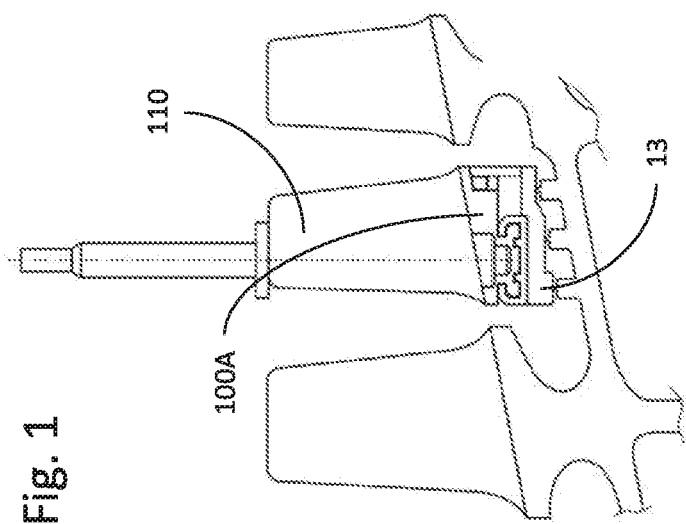

TURBOMACHINE SEALING RING

This claims the benefit of German Patent Application DE 102017211316.2, filed Jul. 4, 2017 and hereby incorporated by reference herein.

The present invention relates to a sealing ring for a turbomachine, an assembly, a compressor or turbine stage, and a gas turbine having the sealing ring, as well as a method for manufacturing the sealing ring.

BACKGROUND

In turbomachines, sealing rings are used, in particular, for sealing between rotating components and casing-mounted components to which the sealing rings are attached.

SUMMARY OF THE INVENTION

In accordance with in-house practice, such sealing rings have heretofore usually been manufactured by mechanical machining using lathes, and therefore are mostly rotationally symmetric or have constant profile cross sections in the circumferential direction.

It is an object of an embodiment of the present invention to improve a turbomachine sealing ring, in particular the manufacture thereof The present invention provides a sealing ring, and a method a method for manufacturing a sealing ring. An assembly, a compressor or turbine stage and a gas turbine having at least one sealing ring as described herein is also provided. Advantageous embodiments of the present invention are the subject matter of the dependent claims.

In an embodiment of the present invention, a sealing ring, in particular a so-called seal carrier, for a turbomachine, in particular a compressor or turbine stage of a gas turbine, in particular a sealing ring of an assembly for, or of, a compressor or turbine stage of a gas turbine, in particular one or more sealing rings of a compressor stage and/or a turbine stage of a gas turbine, in particular of an aircraft engine, (each) has/have a seal which, in an embodiment, is at least partially formed in a honeycomb-like manner and/or integrally or in one piece with the remainder of the sealing ring and/or is provided or adapted or used as an abradable coating, in particular to permit rubbing-in and/or sealing of sealing fins of a rotor of the turbomachine.

In an embodiment, the sealing ring is, in particular detachably and/or interlockingly and/or frictionally, attached to or adapted to be attached to or used on a stator ring on which, in an embodiment, in particular on an opposite side, stator vanes are, in particular adjustably, arranged, in particular rotatably supported in bushings.

This constitutes a particularly advantageous application of sealing ring according to the present invention.

In an embodiment of the present invention, a profile cross section of the sealing ring varies in the circumferential direction or along its circumference.

In an embodiment, this allows obtaining a load-adapted, varying bending stiffness and/or an advantageous bushing-retaining and/or anti-rotation feature, while at the same time keeping the low total weight.

In an embodiment, the profile cross section varies non-continuously or abruptly at one or more circumferential positions, in particular separation points or end faces of the then circumferentially segmented ring.

In an embodiment, this makes it possible to implement an advantageous bushing-retaining and/or anti-rotation feature.

Additionally or alternatively, in an embodiment, the profile cross section varies at least in some regions, in particular over at least 10%, in particular at least 20%, of the circumference, continuously or monotonically, in particular strictly monotonically, in particular linearly with the circumferential position.

In an embodiment, this makes it possible to obtain a load-adapted, varying bending stiffness and/or an advantageous bushing-retaining feature.

In an embodiment of the present invention, the sealing ring, in particular one or more of its hereinafter described ring segments, in particular sub-segments, is/are (each) partially or completely manufactured by a generative manufacturing process, in particular by selective laser deposition. A generative manufacturing process may be referred to as an additive manufacturing process or as a rapid prototyping process and/or as layer-by-layer manufacture by locally or selectively solidifying a feedstock material that is in particular liquid, pasty or in bulk form, in particular in powder or granular form. Particularly advantageously, selective laser melting or laser sintering is used as the generative manufacturing process, without the present invention being limited thereto.

In an embodiment, this makes it possible for the varying profile cross section to be produced in an advantageous fashion.

In an embodiment, the sealing ring has one or more radially projecting rib(s) or radial rib(s) extending in the circumferential direction entirely therearound or over its full circumference or over a portion thereof. In an embodiment, the, in particular axial and/or radial, dimension(s) of the radially projecting or radial rib(s), in particular the axial and/or radial height(s) or width(s), and/or, in particular axial and/or radial, position(s) or location(s), varies or vary in the circumferential direction or along the circumference of the sealing ring, in particular non-continuously at one or more circumferential positions and/or continuously at least in some regions.

Additionally or alternatively, in an embodiment, the sealing ring has one or more axially projecting rib(s) or axial rib(s) extending in the circumferential direction entirely therearound or over its full circumference or over a portion thereof. In an embodiment, the, in particular axial and/or radial, dimension(s) of the axially projecting or axial rib(s), in particular the axial and/or radial height(s) or width(s), and/or, in particular axial and/or radial, position(s) or location(s), vary/varies in the circumferential direction or along the circumference of the sealing ring, in particular non-continuously at one or more circumferential positions, in particular separation points, and/or continuously at least in some regions.

In an embodiment, such circumferentially varying radial and/or axial ribs make it possible to implement a load-adapted, varying bending stiffness and/or an advantageous bushing-retaining and/or anti-rotation feature. A circumferentially extending rib may in some regions also be interrupted; i.e., its height or width may be reduced to zero.

As is customary in the art, in particular, the term "axial" as used herein refers to a direction parallel to or along a (main) machine axis or axis of rotation of the turbomachine, the term "circumferential direction" correspondingly refers to a direction of rotation (of a (main) rotor) of the turbomachine, and the term "radial" correspondingly refers to a direction that is perpendicular to the axial and circumferential directions or a (coordinate) axis perpendicular to a (main) machine axis or axis of rotation of the turbomachine In an embodiment, the, or one or more of the, axial rib(s) is/are disposed on a radial flange which, in an embodiment, extends radially outwardly form a circumferential surface of the sealing ring and/or is disposed in an upstream-most or a downstream-most axial quarter of the sealing ring, in particular at what is referred to as a bulkhead.

In an embodiment, this makes it possible to obtain a load-adapted, varying bending stiffness and/or an advantageous anti-rotation feature.

Additionally or alternatively, the, or one or more of the, radial rib(s) is/are disposed on a circumferential surface, in particular in an, in particular undercut, circumferential groove, by which the sealing ring is, in particular detachably and/or interlockingly and/or frictionally, attached to or adapted to be attached to or used on the stator ring.

In an embodiment, this makes it possible to obtain a load-adapted, varying bending stiffness and/or an advantageous bushing-retaining feature.

In an embodiment, the sealing ring has circumferentially, in particular equidistantly, spaced-apart supports, which are formed in a pitch-circle or ring-like manner and/or integrally or in one piece with the remainder of the sealing ring and/or project radially, and which are disposed on a, or the, circumferential surface, in particular in a, or the, in particular undercut, circumferential groove for attachment of the sealing ring, and which radially retain or are adapted or used to radially retain bushings of a carrier of the sealing ring, in particular bushings of the stator ring, in which, in an embodiment, the stator vanes thereof are adjustably supported, in particular with (radial) play.

In an embodiment, this makes it possible in particular to implement an advantageous bushing-retaining feature.

In an embodiment, the, or one or more of the, radial rib(s), has, or each have, one or more of the supports or interconnect them in the circumferential direction.

Thus, in an embodiment, these radial ribs are advantageously capable of retaining the bushings already during installation or prior to reaching the supports associated therewith and/or of, in particular at the same time, obtaining a load-adapted, varying bending stiffness.

In an embodiment, the sealing ring is divided or segmented into at least two ring segments arranged in succession in the circumferential direction. It may in particular be divided or segmented into two ring segments of equal circumferential length.

In an embodiment, this makes it possible to simplify the manufacture and/or installation of the sealing ring.

In an embodiment, one or more of these ring segments may (each) have two or more, in particular at least, in particular exactly, three sub-segments which are arranged in succession in the circumferential direction and which, in an embodiment, are joined by material-to-material bonding, in particular by brazing or welding, (to form the respective ring segment) and/or which are at least substantially equal in circumferential length. Accordingly, in an embodiment, one ring half extends from 0° to 180° and the other ring half from 180° to 360° and, in a refinement, the sub-segments thereof extend from 0° to 60°, 60° to 120° and 120° to 180° and from 180° to 240°, 240° to 300° and 300° to 360°, respectively, in particular with respect to a dividing plane of the circumferentially divided turbomachine.

In an embodiment, this makes it possible in particular to simplify the generative manufacture of the respective ring segment, in particular to use (more) compact generative manufacturing equipment.

Additionally or alternatively, in an embodiment, at least two facing end faces of circumferentially successive ring segments have different or dissimilar profiles, in particular axial rib (segment) end faces having dissimilar, in particular axial and/or radial, dimensions and/or configurations, and/or mutually aligned or congruent radial rib (segment) end faces.

In an embodiment, end faces of radial ribs, which end faces are mutually aligned at separation points of adjacent ring segments, advantageously make it possible to retain bushings already during installation or prior to reaching the supports associated therewith and/or to obtain advantageous bending stiffnesses.

In an embodiment, end faces of axial ribs, which end faces are arranged differently at separation points of adjacent ring segments; i.e., mutually offset axial rib segments on adjacent ring segments; i.e., axial ribs (rib arrangements) non-continuously varying at separation points, make it possible to implement an advantageous anti-rotation feature.

In an embodiment, in particular for this purpose, the stator ring is (also) divided into at least, in particular exactly, two stator ring segments, in particular stator ring halves, arranged in succession in the circumferential direction. In the circumferential direction, at least one end face of a stator ring segment and one end face of an adjacent ring segment of the segmented sealing ring overlap or overlay one another partially, in particular radially and/or axially, to lock against rotation (twisting). In other words, in an embodiment, at least one axial rib of a ring segment forms, in the circumferential direction, a form-fitting abutment for a stator ring segment disposed on an adjacent ring segment.

In an embodiment, one or more end face(s) of one or more of the sub-segments each has/have one or more projections in the circumferential direction, which (each) engages/engage, in particular form-fittingly, into an, in particular congruent, cutbacks of an end face of an adjacent one of the sub-segments and, in an embodiment, is/are joined thereto by material-to-material bonding, in particular by brazing or welding.

In an embodiment, such "toothed engagement" allows a bending loading and/or a material-to-material bond to be improved compared to a design with a butt joint between the sub-segments.

In an embodiment, at least one of the ribs has a greater maximum, in particular axial and/or radial, dimension, in particular axial and/or radial height or width, in a middle fifth of a circumference of a ring segment than in one or both of the circumferentially adjacent fifths of the circumference. In particular, in an embodiment, the, or at least one of the, axial rib(s) of one or both ring halves, which each extend circumferentially over 180° between their end faces, has a greater maximum dimension, in particular axial and/or radial height or width, in a range between 2×(180°/5)=72° and 3×(180°/5)=108° than in a range between 36° and 72° and/or a range between 108° and 144°.

In an embodiment, this allows the bending stiffness to be adapted in particular a loading of such circumferentially divided sealing rings.

Additionally or alternatively, in an embodiment, at least one of the ribs has an (axially) local thickening or increased, in particular axial and/or radial, dimension, in particular axial and/or radial height or width, at at least one separation point of the segmented sealing ring or at last one end face of a ring segment of the segmented sealing ring.

In an embodiment, this makes it possible to implement the anti-rotation feature, while at the same time keeping the weight low.

BRIEF DESCRIPTION OF THE DRAWINGS

Other advantageous embodiments of the present invention will become apparent from the dependent claims and the following description of preferred embodiments. To this end, the drawing shows, partly in schematic form, in:

FIG. 1: a compressor stage of a gas turbine having a sealing ring according to an embodiment of the present invention;

DETAILED DESCRIPTION

FIG. 1 shows, in meridional cross section, a compressor stage of a gas turbine having a sealing ring according to an embodiment of the present invention.

The stage has a stator ring which is circumferentially divided into two halves 100A, 100B (compare FIGS. 6A, 6B) and on which stator vanes 110 (compare FIG. 1) are rotatably and thus adjustably supported in a generally known manner, in one embodiment in bushings (not shown) or without bushings.

On a side radially opposite the stator vanes or an inner side of stator ring halves 100A, 100B (at the bottom in FIG. 6A, 6B), a half 10A, 10B of the divided sealing ring is mounted respectively by inserting stator ring halves 100A, 100B into undercut circumferential grooves 11.

Figure 3:
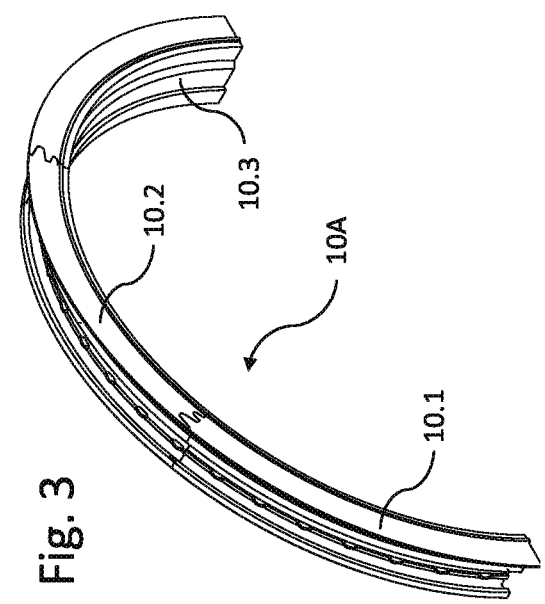
FIG. 3: a perspective view of the sealing ring half.
Figure 4:
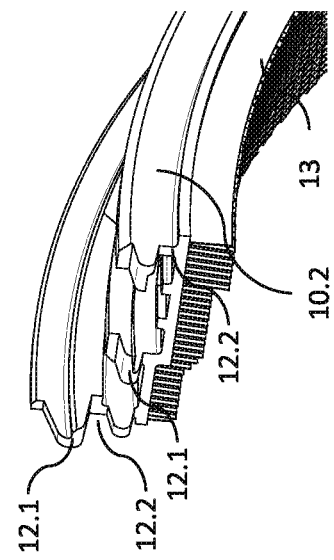
FIG. 4: a perspective view of an end face of a sub-segment of the sealing ring half.
Figure 2:
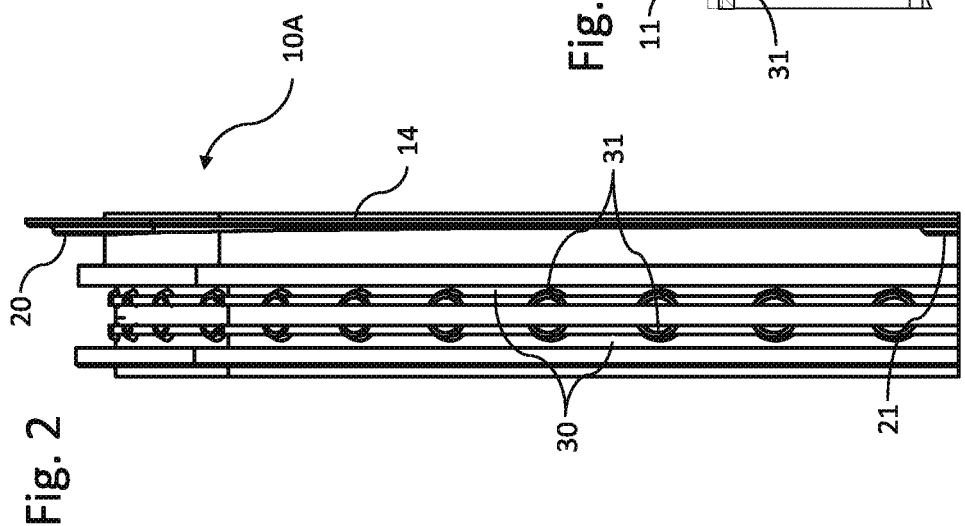
FIG. 2: a side view of a sealing ring half of one of the segmented sealing rings.

FIGS. 2, 3 exemplarily show a sealing ring half 10A in a side view (FIG. 2) and in a perspective view (FIG. 3). The other sealing ring half 10B of the segmented sealing ring is identically constructed except for the differences described below, and therefore reference is made to the description of sealing ring half 10A.

As can be seen especially in FIG. 3, sealing ring half 10A is assembled from three sub-segments 10.1, 10.2 and 10.3 arranged in succession in the circumferential direction, which, in a preferred embodiment, are joined together by material-to-material bonding, in particular by brazing or welding.

Facing end faces of sub-segments 10.1, 10.2 and 10.3 have projections 12.1 in the circumferential direction, which engage into congruent cutbacks 12.2 of the associated end faces of the adjacent sub-segments of the respective sealing ring half.

Figure 5:
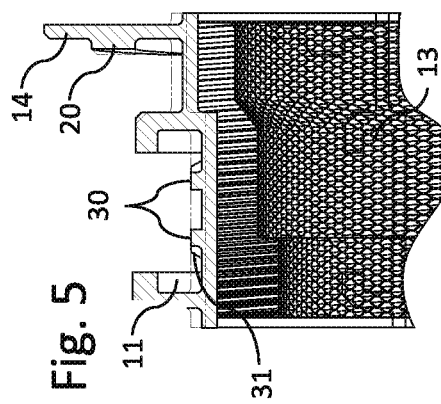
FIG. 5: a profile cross section of the sealing ring.

A radial flange or bulkhead 14 is formed with an axial rib 20 which extends circumferentially therearound and whose axial height (horizontal in FIG. 5) varies in the circumferential direction.

As can be seen especially in FIG. 2, rib 20 has a local thickening 21 at each of the separation points of the sealing ring; i.e., at the end faces of sealing ring halves 10A, 10B (at the bottom in FIGS. 2, 3). Beyond this thickening, the axial height is initially greatly reduced, in some instances to zero, in order to reduce the weight of the sealing ring.

From there, the axial height increases in each case toward the middle of the sealing ring half (at the top in FIGS. 2, 3). In this way, a bending stiffness is advantageously adapted to a loading of the circumferentially divided sealing ring during operation.

Figure 6C:
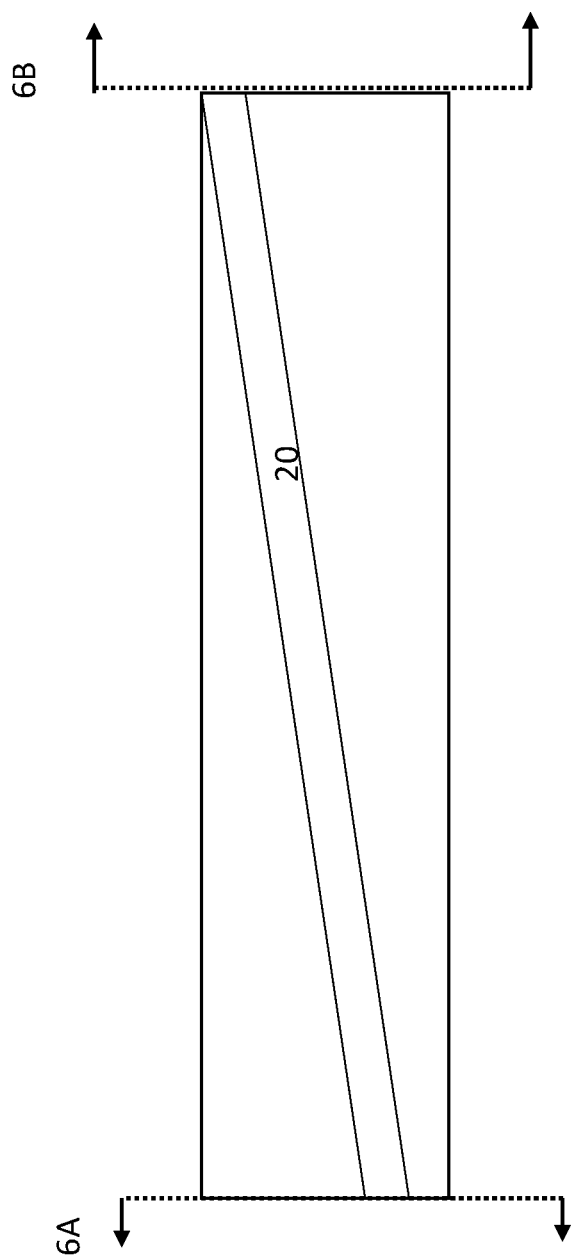
FIGS. 6A, B, C: the end faces of the two halves of the sealing ring with the axial rib varying from one end face to the other.

As will be appreciated, especially when considering FIGS. 6A, 6B together, local thickenings 21 at the end faces of the two sealing ring halves 10A, 10B are radially offset with respect to each other: on sealing ring half 10A, axial rib 20 or thickening 21 is disposed at about half the height of radial flange 14, on sealing ring half 10B radially outwardly on radial flange 14.

Thus, the radial position of axial rib 20 in the circumferential direction varies non-continuously at the separation points or end faces; in the regions therebetween, the axial dimension of axial rib 20 varies continuously as shown in FIGS. 6A, B, C.

When viewing FIGS. 6A, 6B together, it can further be seen that the end faces of stator ring halves 100A, 100B are configured to overlap the axial rib 20 or thickening 21 at the end face of the respective adjacent sealing ring half 10B or 10A, thereby preventing, through form-fit, relative rotation between sealing ring and stator ring (halves).

Disposed in circumferential groove 11 are two radial ribs 30 extending circumferentially therearound.

These ribs each connect or have circumferentially spaced-apart supports 31 for radially retaining the bushings in which stator vanes 110 are adjustably supported.

Thus, the axial width of radial ribs 30 varies locally in the circumferential direction in the region of supports 31, while at the separation points of the segmented sealing ring or the end faces of its ring halves 10A, 10B, radial ribs 30 are mutually aligned.

When slipping circumferential grooves 11 of sealing ring halves 10A, 10B onto the stator ring halves 100A, 100B attached to stator vanes 110, the supports 31 of radial ribs 30 retain the bushings radially in the final assembled or operational condition.

In this connection, supports 31 advantageously make it possible to provide a larger supporting or retaining surface, while the portions of radial ribs 30 located therebetween advantageously make it possible to reduce weight and/or to (further) increase the bending stiffness.

Sub-segments 10.1-10.3 of sealing ring halves 10A, 10B are each generatively manufactured together with the honeycomb-like abradable coating 13 by selective laser melting or selective laser sintering.

The term "honeycomb-like" refers to an abradable coating having cavities formed therein. In a preferred embodiment, at least a portion of the cavities may be completely separated from one another. The term "honeycomb-like" is not intended to describe a specific geometry of the walls cavities separating the cavities in the radial direction; i.e., is not limited to the conventional hexagonal honeycomb shape.

Although exemplary embodiments have been described in the foregoing, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection as is derived from the claims and the combinations of features equivalent thereto.

LIST OF REFERENCE NUMERALS

10A, 10B sealing ring half
10.1-10.3 sub-segment
11 circumferential groove
12.1 projection
12.2 cutback
13 abradable coating (seal)
14 radial flange 20 axial rib
21 thickening
30 radial rib
31 support
100A, 100B stator ring half
110 stator vane

What is claimed is:

1. A sealing ring for a turbomachine, the sealing ring comprising:
   a plurality of ring segments, wherein each ring segment extends circumferentially and has a first axial edge and a second axial edge, wherein each ring segment includes:
   a continuous radial flange extending circumferentially along said ring segment from one circumferential end face to the other circumferential end face of the ring segment;
   an axial rib between said first axial edge and said second axial edge projecting axially from the radial flange in a direction away from the first axial edge and towards the second axial edge, the axial rib having a radial height that continuously varies in the circumferential direction;
   a seal on an inwardly facing side of each ring segment.

2. The sealing ring as recited in claim 1 wherein the axial rib has an axial dimension that varies in the circumferential direction.

3. The sealing ring as recited in claim 2 wherein, on each ring segment, a pair of radial ribs are disposed on a circumferential surface in a circumferential groove located between the first and second axial edges, the radial ribs projecting radially from the circumferential surface and extending circumferentially along said ring segment.

4. The sealing ring as recited in claim 3 wherein the circumferential groove includes an undercut.

5. The sealing ring as recited in claim 3, wherein each radial rib has a axial width that varies in the circumferential direction.

6. The sealing ring as recited in claim 1 further comprising circumferentially spaced-apart supports disposed on a circumferential surface and adapted to radially retain bushings of a carrier of the sealing ring.

7. The sealing ring as recited in claim 6 wherein the circumferential surface is in a circumferential groove for attachment of the sealing ring.

8. The sealing ring as recited in claim 7 wherein the circumferential groove includes an undercut.

9. The sealing ring as recited claim 7 wherein, on each ring segment, a pair of radial ribs are disposed on a circumferential surface in the circumferential groove, each radial rib projecting radially from the circumferential surface and extending circumferentially along said ring segment, and wherein the radial rib has the supports.

10. The sealing ring as recited in claim 1 wherein the ring segments are arranged in succession in the circumferential direction.

11. The sealing ring as recited in claim 10 wherein at least one of the ring segments has at least two sub-segments arranged in succession in the circumferential direction and joined by material-to-material bonding or at least two facing end faces of circumferentially successive ring segments have different profiles.

12. The sealing ring as recited in claim 1, wherein axial rib end faces of the axial rib of each ring segment have dissimilar dimensions or configurations.

13. The sealing ring as recited in claim 11 wherein at least one of the circumferential end faces of at least one of the sub-segments has at least one projection in the circumferential direction, the projection engaging into a cutback of an end face of an adjacent one of the sub-segments.

14. The sealing ring as recited in claim 1 wherein the seal is a partial honeycomb or integral seal.

15. The sealing ring as recited in claim 14 wherein the seal is an abradable coating.

16. The sealing ring as recited in claim 1 wherein the sealing ring is at least partially manufactured by a generative manufacturing process.

17. The sealing ring as recited in claim 1 wherein the sealing ring varies in the circumferential direction at separation points defined by end faces of the ring segments.

18. An assembly for a turbomachine, the assembly comprising a stator ring and stator vanes arranged on the stator ring; and to which at least one sealing ring as recited in claim 1 is detachably, interlockingly or frictionally attached.

19. The assembly as recited in claim 18 wherein the stator vanes are arranged adjustably on the stator ring.

20. The assembly as recited in claim 18 wherein the sealing ring is attached on an opposite side.

21. The assembly as recited in claim 18 wherein the stator ring has at least two stator ring segments arranged in succession in the circumferential direction, and wherein, in the circumferential direction, at least one of the circumferential end faces of a stator ring segment and one of the circumferential end faces of an adjacent ring segment of the segmented sealing ring overlap one another partially.

22. The assembly as recited in claim 21 wherein the overlapping is axially or radially to lock against twisting.

23. A compressor or turbine stage for a gas turbine comprising the assembly as recited in claim 18.

24. A gas turbine comprising at least one compressor or turbine stage as recited in claim 23.

25. An aircraft engine comprising the gas turbine as recited in claim 24.

26. A method for manufacturing the sealing ring as recited in claim 1 comprising at least partially manufacturing the sealing ring by a generative manufacturing process.

27. The method as recited in claim 26 wherein the generative manufacturing process includes selective laser deposition.

\* \* \* \* \*